(12) United States Patent
Miller et al.

(10) Patent No.: US 10,609,932 B2
(45) Date of Patent: Apr. 7, 2020

(54) THREE-PADDLE ROCKER CHILLER

(71) Applicant: John Bean Technologies Corporation, Chicago, IL (US)

(72) Inventors: Lucas M. Miller, London, AR (US); Jeremy B. Estes, London, AR (US); J. Barton Langley, Russellville, AR (US); Michael E. Miller, Hattieville, AR (US)

(73) Assignee: John Bean Technologies Corporation, Chicago ( * ) Notice: Subject to any disclaimer, the term of this patent is extended or adjusted under 35 U.S.C. 154(b) by 388 days.

(21) Appl. No.: 14/538,406

(22) Filed: Nov. 11, 2014

(65) Prior Publication Data
US 2015/0129170 A1     May 14, 2015

Related U.S. Application Data

(60) Provisional application No. 61/903,241, filed on Nov. 12, 2013, provisional application No. 61/950,468, filed on Mar. 10, 2014, provisional application No. 62/016,764, filed on Jun. 25, 2014.

(51) Int. Cl.
*A22B 5/00* (2006.01)
*A22C 21/00* (2006.01)

(52) U.S. Cl.
CPC ........ *A22B 5/0076* (2013.01); *A22C 21/0061* (2013.01)

(58) Field of Classification Search
CPC ....... A22B 5/0076; A23B 4/062; A23B 4/064; A23B 4/09; A23B 7/06; A22C 21/00; A22C 21/0061; F25D 13/065; Y02P 60/851

USPC ............................................ 62/378; 165/185
See application file for complete search history.

(56) References Cited

U.S. PATENT DOCUMENTS

| | | | |
|---|---|---|---|
| 54,597 A | 5/1866 | Quick | |
| 792,721 A | 6/1905 | McCarty | |
| 2,039,276 A * | 5/1936 | Ayars | A23N 12/02 |
| | | | 134/126 |
| 2,164,277 A | 6/1939 | James | |
| 2,942,429 A | 6/1960 | Van Dolah et al. | |

(Continued)

OTHER PUBLICATIONS

"HMR Chillers," Product Specification Sheet, © 2013 Morris & Associates, Garner, North Carolina, <http://morris-associates.com/products/poultry-chilling/hmr-chillers/> [retrieved Sep. 23, 2013], pp. 1-12.

Primary Examiner — Elizabeth J Martin
(74) Attorney, Agent, or Firm — Christensen O'Connor Johnson Kindness PLLC

(57) ABSTRACT

A rocker-type poultry chiller, including a tank for receiving poultry carcasses and holding chilled water, an axle mounted in the tank, a main paddle connected to the axle, and a side paddle connected to the axle. The oscillation of the main paddle and the side paddle urges the carcasses upwardly and laterally, which contributes to the cooling of the carcasses as a result of their thorough contact in the chilled water. The movement of the paddles also gently massages the carcasses by gently bumping them against the paddle blades and the wall of the tank. The repeated compression of the carcasses tends to tenderize the meat. The side paddles ensure more predictable and consistent contact between the paddles and all of the carcasses, which causes more agitation of the carcasses and more effective washing of the carcasses.

19 Claims, 2 Drawing Sheets

(56) References Cited

U.S. PATENT DOCUMENTS

| | | | | |
|---|---|---|---|---|
| 3,240,026 | A | * | 3/1966 | Van Dolah .............. A23B 4/062 62/374 |
| 3,340,696 | A | * | 9/1967 | Zebarth ................. A23B 4/062 62/375 |
| 3,363,638 | A | * | 1/1968 | Zebarth ................. A22C 21/00 134/126 |
| 3,378,237 | A | | 4/1968 | Horton |
| 3,407,872 | A | * | 10/1968 | Crane ...................... A23B 4/06 165/109.1 |
| 5,095,812 | A | | 3/1992 | Yahav et al. |
| 5,868,000 | A | | 2/1999 | Morris, Jr. et al. |
| 6,105,490 | A | | 8/2000 | Horn et al. |
| 7,588,489 | B2 | * | 9/2009 | Morris, III ......... A22C 21/0061 452/173 |
| 7,757,603 | B2 | | 7/2010 | Bokelmann et al. |
| 8,146,380 | B1 | * | 4/2012 | Wright ...................... A23L 3/36 165/109.1 |
| 2007/0169502 | A1 | * | 7/2007 | Morris ................. A22B 5/0076 62/374 |
| 2007/0263480 | A1 | | 11/2007 | Saalmann et al. |
| 2011/0179812 | A1 | | 7/2011 | Goldstein |
| 2011/0203778 | A1 | | 8/2011 | Estes et al. |
| 2011/0255364 | A1 | | 10/2011 | Kato |
| 2012/0281495 | A1 | * | 11/2012 | Singh ................. B01F 3/04539 366/276 |
| 2013/0175009 | A1 | * | 7/2013 | Miller .................... A23B 4/064 165/104.31 |

* cited by examiner

THREE-PADDLE ROCKER CHILLER

CROSS-REFERENCE TO RELATED APPLICATIONS

This application claims the benefit of U.S. Provisional Application No. 61/903,241, entitled "Three-Paddle Rocker Chiller" and filed on Nov. 12, 2013, U.S. Provisional Application No. 61/950,468, entitled "Three-Paddle Rocker Chiller" and filed on Mar. 10, 2014, and U.S. Provisional Application No. 62/016,764, entitled "Three-Paddle Rocker Chiller" and filed on Jun. 25, 2014. The complete disclosure of said provisional patent applications are hereby incorporated by reference.

STATEMENT REGARDING FEDERALLY SPONSORED RESEARCH OR DEVELOPMENT

Not applicable

BACKGROUND OF THE INVENTION

1. Field of the Invention

The present invention relates generally to the field of poultry chillers and, more particularly, to a three-paddle rocker chiller for use in poultry processing for increasing product washing and cooling of poultry carcasses.

2. Brief Description of the Related Art

Rocker chillers are well-known in the poultry processing industry. The prior art rocker chillers typically include a tank for holding a heat-exchanging liquid and a paddle that oscillates to stir up the carcasses within the tank for purposes of cooling the carcasses. The contact between the carcasses and the paddle also causes product washing.

It would therefore be desirable to develop a rocker chiller for cooling poultry carcasses that functions to increase product washing more than the prior art rocker chillers.

BRIEF SUMMARY OF THE INVENTION

The rocker chiller of the present invention includes an elongated tank for holding a chilled liquid; a main paddle assembly; a side main paddle assembly including two side paddles; and power means for oscillating the main paddle and the two side paddles in an arc along the bottom of the tank. The present invention is also directed to a method of using a 3-paddle rocker chiller to cool and increase washing of poultry carcasses.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1A:
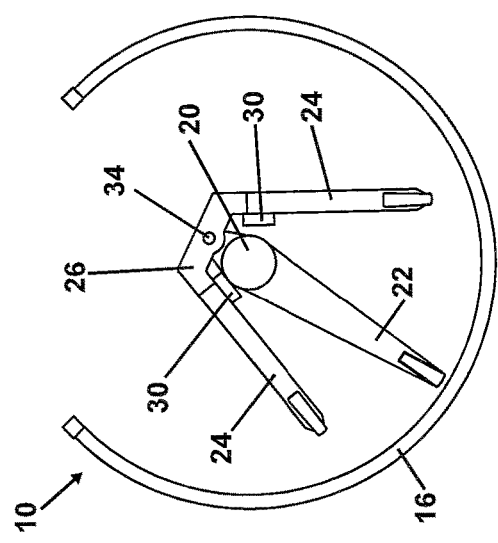
FIGS. 1A-1C are end views of the first preferred embodiment of the rocker chiller of the present invention.

With reference to FIGS. 1A-3C, the preferred embodiments of the present invention may be described. The rocker chiller 10 of the present invention includes a semi-cylindrical tank 12 that contains a body of chilling liquid 14. The tank 12 is generally formed from an elongated longitudinal wall 16, an inlet wall (not shown), and an outlet wall (not shown). A longitudinal axis extends between the inlet wall and outlet wall of the tank 12. The chilling liquid 14 preferably includes water and may also include antimicrobial agents or other additives of the type well-known to those skilled in the art. The temperature of the cooling liquid is preferably slightly above 32 degrees F., however, the temperature of the cooling liquid may vary depending on the particular use of the rocker chiller in poultry processing.

Poultry carcasses are introduced into an inlet end of the tank 12. The carcasses are cooled by the chilling liquid 14 before being removed from the outlet end of the tank 12 by an unloader (not shown) of the type well-known to those skilled in the art. As the carcasses move in the chiller towards the outlet end, a main paddle assembly 18 and a side paddle assembly 32 oscillate through the tank 12. The paddle assemblies 18, 32 contact and stir the carcasses to ensure thorough contact with the chilled liquid 14. The contact of the carcasses with the chilling liquid 14 lowers the temperature of the carcasses, while the contact of the carcasses with the paddle assemblies causes more effective washing of the carcasses.

The main paddle assembly 18 includes a main paddle 22 mounted to an axle or shaft 20 aligned with the longitudinal axis of the tank 12. The main paddle assembly 18 extends between the inlet wall and outlet wall of the tank 12. The main paddle 22 extends downwardly from the axle 20 and supports an elongated paddle blade 28 at its distal end. The main paddle 22 extends from the axle 20 towards the concave inner surface of the longitudinal wall 16 of the tank 12 so that the paddle blade 28 is positioned closely adjacent the concave longitudinal wall 16. The side paddle assembly 32 includes two side paddles 24. Each of the side paddles 24 also supports an elongated paddle blade 28 at their distal end.

In the first preferred embodiment, the two side paddles 24 are joined between a cross bar 26. The cross-bar 26 is connected to the top surface of the axle 20 and extends the length of the axle. A bearing or bushing is preferably attached to the axle 20, however, it should be understood that other means for connecting the cross-bar 26 and the axle 20 that would be well-known to those skilled in the art may be utilized. The side paddles 24 extend the entire length of the main paddle 22. The side paddles 24 extend downwardly towards the longitudinal wall 16 of the tank 12 and are positioned on opposite sides of the main paddle 22. The axle 20 is coupled to a power means (not shown) for rotating the axle in an oscillating fashion to oscillate the paddle assemblies 18, 32 in the tank 12. The power means preferably is an electric motor, but it may be any other device for moving the paddle assemblies that would be well-known to those skilled in the art. The main paddle assembly 18 oscillates along a path that follows the curved bottom portion of the tank 12.

In an example of the first preferred embodiment, as shown in FIG. 1A, each side paddle 24 forms a 30.9° angle with respect to the main paddle 22 at the resting position. The side paddles 24 move along approximately the same arc as the main paddle 22. The side paddles 24, however, are not fixed in position with respect to the main paddle 22. Instead, the side paddles 24 are capable of pivoting or swiveling within a certain range. Thus, the angle between the side paddles 24 and the main paddle 22 can change. The side paddle assembly pivots at the point 34 where the cross-bar 26 is connected to the axle 20. Stops 30 are joined to the inside surface of each of the side paddles 24 and are positioned between the side paddles 24 and the axle 20.

Figure 1B:
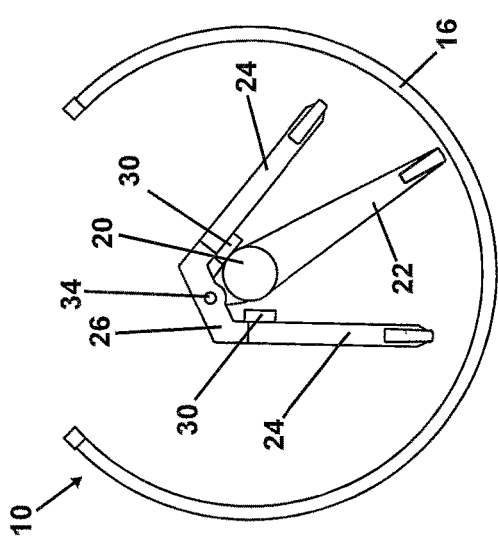

As the axle rotates and the main paddle 22 oscillates along the longitudinal wall 16 up and to the right, which is shown in FIG. 1B, the right stop 30 associated with right side paddle 24 contacts the axle 20. The stop 30 prevents the right side paddle 24 from moving any closer to the main paddle 22, thus ensuring a space between the right side paddle 24 and the main paddle 22. When the stop 30 is contacting the axle 20, the angle between the right side paddle 24 and the main paddle 22 in the example embodiment is 24.1°. Because of the pivoting feature of the side paddles 24, when the angle and distance between the right side paddle 24 and the main paddle 22 decreases, the angle and distance between the left side paddle 24 and the main paddle 22 necessarily increases. As shown in FIG. 1B, when the right stop 30 is contacting the axle 20, the angle between the left side paddle 24 and the main paddle 22 in the example embodiment is 37.7°.

Figure 1C:
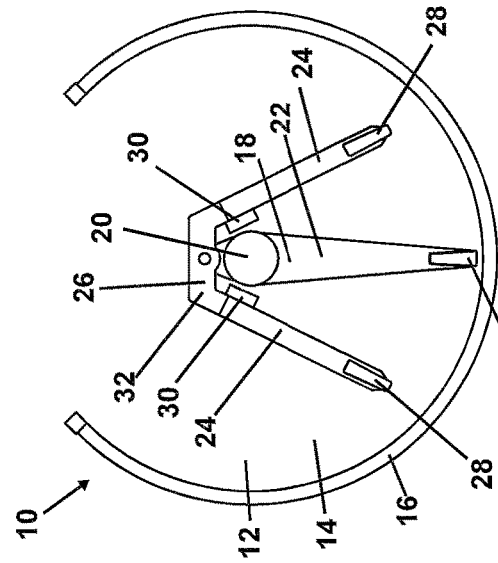

As the main paddle 22 oscillates along the longitudinal wall 16 up and to the left, which is shown in FIG. 1C, the left stop 30 associated with left side paddle 24 contacts the axle 20. The stop 30 prevents the left side paddle 24 from moving any closer to the main paddle 22, thus ensuring a space between the left side paddle 24 and the main paddle 22. When the stop 30 is contacting the axle 20, the angle between the left side paddle 24 and the main paddle 22 in the example embodiment is 24.1°. Because of the pivoting feature of the side paddles 24, when the angle and distance between the left side paddle 24 and the main paddle 22 decreases, the angle and distance between the right side paddle 24 and the main paddle 22 necessarily increases. As shown in FIG. 1C, when the left stop 30 is contacting the axle 20, the angle between the right side paddle 24 and the main paddle 22 in the example embodiment is 37.7°. It should be understood that the angles described herein between the side paddles and the main paddle are exemplary only and not limiting to the full scope of the present invention.

Figure 2A:
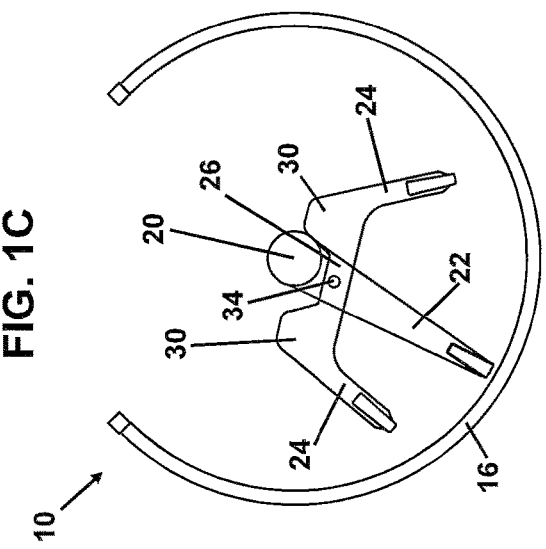
FIGS. 2A-2C are end views of the second preferred embodiment of the rocker chiller of the present invention.

In the second preferred embodiment, the cross-bar 26 is connected to both longitudinal ends of the main paddle 22 directly under the axle 20. The side paddles 24 extend the entire length of the main paddle 22. The side paddles 24 extend downwardly towards the longitudinal wall 16 of the tank 12 and are positioned on opposite sides of the main paddle 22. At the resting position, as shown in FIG. 2A, each side paddle 24 preferably is equally spaced from the main paddle 22. The side paddles 24 move along approximately the same arc as the main paddle assembly 18. The side paddles 24, however, are not fixed in position with respect to the main paddle 22. Instead, the side paddles 24 are capable of pivoting or swiveling within a certain range. The side paddle assembly pivots at the point 34 where the cross-bar 26 is connected to the main paddle 22. Instead of being positioned on the inside surfaces of the side paddles like in the first embodiment, the stops 30 in the second embodiment are rounded portions at the top of the side paddles 24. The axle 20 is positioned within the channel created by the two stops 30.

Figure 2B:
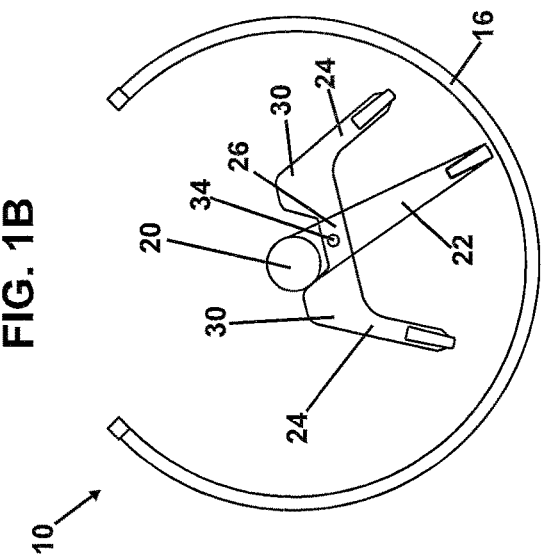

As the main paddle 22 oscillates along the longitudinal wall 16 up and to the right, which is shown in FIG. 2B, the left stop 30 associated with left side paddle 24 contacts the axle 20. The stop 30 prevents the right side paddle 24 from moving any closer to the main paddle 22, thus ensuring a space between the right side paddle 24 and the main paddle 22. Because of the pivoting feature of the side paddles 24, when the distance between the right side paddle 24 and the main paddle 22 decreases, the distance between the left side paddle 24 and the main paddle 22 necessarily increases.

Figure 2C:
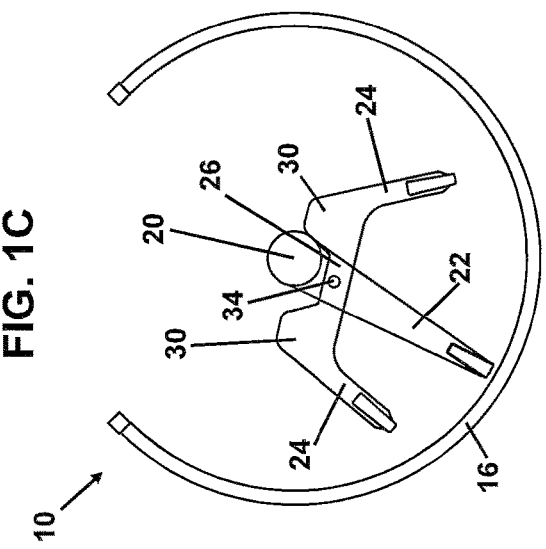

As the main paddle 22 oscillates along the longitudinal wall 16 up and to the left, which is shown in FIG. 2C, the right stop 30 associated with right side paddle 24 contacts the axle 20. The stop 30 prevents the left side paddle 24 from moving any closer to the main paddle 22, thus ensuring a space between the left side paddle 24 and the main paddle 22. Because of the pivoting feature of the side paddles 24, when the distance between the left side paddle 24 and the main paddle 22 decreases, the angle and distance between the right side paddle 24 and the main paddle 22 necessarily increases.

In the third preferred embodiment, the side paddle assembly 32 is fixed in position in relation to the main paddle 22. The side paddle assembly 32 is preferably positioned such that the carcasses may contact the side paddles and the main paddle in the space between each side paddle 24 and the main paddle 22. For example, the side paddles 24 may be fixed in position in the configurations shown in FIG. 1A and FIG. 2A, however, it should be understand that the angles may vary from those described above.

Figure 3A:
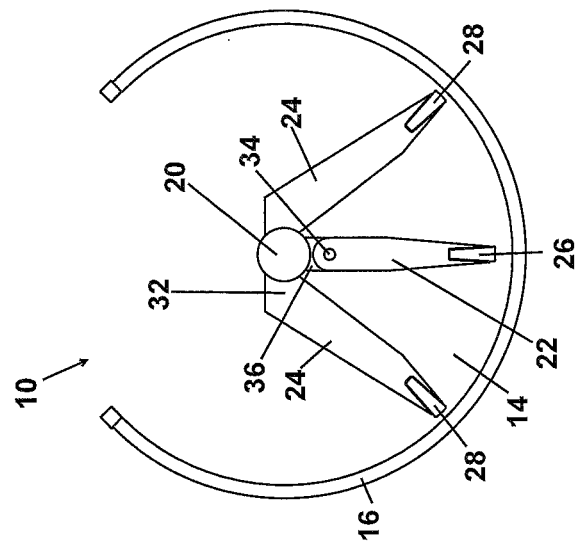
FIGS. 3A-3C are end views of the fourth preferred embodiment of the rocker chiller of the present invention.
Figure 3B:
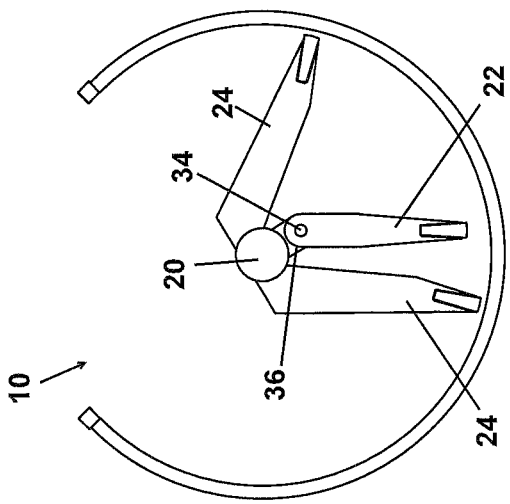
Figure 3C:
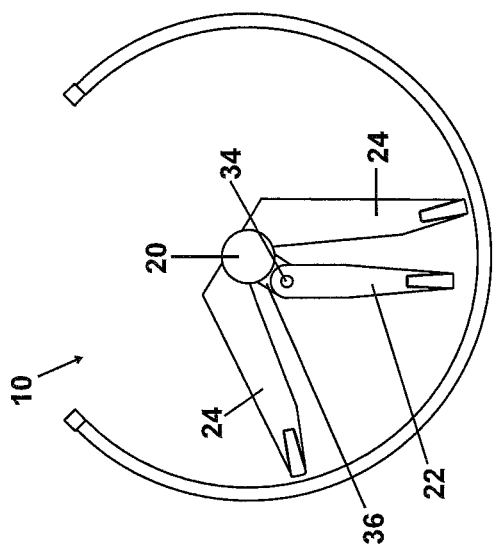

In the fourth preferred embodiment, the side paddles 24 are connected directly to and fixed in position relative to the axle 20. The main paddle 22 is connected to the axle 20 via a connecting piece 36 that extends downwardly from each end of the axle 20. The main paddle 22 is not fixed in position relative to the side paddles 24. The main paddle 22 is capable of pivoting or swiveling within a certain range. The main paddle 22 pivots at the point 34 where the main paddle 22 is connected to the connecting piece 36 extending from the axle 20. Thus, the angle between the main paddle 22 and the side paddles 24 changes as the axle 20 rotates and the side paddles 24 oscillate. At the resting position, as shown in FIG. 3A, each side paddle 24 preferably is equally spaced from the main paddle 22. As the side paddle assembly 32 oscillates along the longitudinal wall 16 up and to the right (as shown in FIG. 3B) or up and to the left (as shown in FIG. 3C), the main paddle 22 remains in approximately the same position. Any movement of the main paddle 22 results from the poultry carcasses contacting the main paddle 22, such as when the carcasses are moved by the oscillating side paddles 24. As the distance between the right side paddle 24 and the main paddle 22 increases, the distance between the left side paddle 24 and the main paddle 22 necessarily decreases. Similarly, as the distance between the left side paddle 24 and the main paddle 22 increases, the distance between the right side paddle 24 and the main paddle 22 necessarily decreases.

The oscillation of the main paddle 22 and side paddles 24 urges the carcasses upwardly and laterally, which contributes to the cooling of the carcasses as a result of their thorough contact in the chilling liquid. The movement of the paddles also gently massages the carcasses by gently bumping them against the paddle blades and the longitudinal wall. The repeated compression of the carcasses tends to tenderize the meat. The side paddles ensure more predictable and consistent contact between the paddles and all of the carcasses, which causes more agitation of the carcasses and more effective washing of the product. This additional agitation causes faster cooling of the carcasses and contributes to more uniform residence time of the carcasses in the chiller. Additional absorption of chilling liquid within the carcasses is a side effect of the extra compression and washing of the carcasses.

While it is believed that three paddles is preferable for achieving the benefits discussed above, the present invention is not limited to a specific number of paddles. In alternative embodiments, the paddle assembly may include only two paddles or may include four or more paddles.

The present invention has been described with reference to certain preferred and alternative embodiments that are intended to be exemplary only and not limiting to the full scope of the present invention.

We claim:

1. A rocker-type poultry chiller, comprising:
   an elongate tank for receiving poultry carcasses and holding chilled water;
   a single axle mounted in the tank and extending lengthwise along the interior of the tank, the axle powered to oscillate about an axis extending along the length of the axle;
   an elongate main paddle connected to the axle, the main paddle having a longitudinal proximal edge portion adjacent to and extending along the length of the axle, the main paddle radiating outwardly from the longitudinal proximal edge portion to define a longitudinal distal edge portion adjacent the interior surface of the tank, the distal edge portion extending lengthwise along the interior of the tank and longitudinal to the length of the tank;
   at least one elongate side paddle connected to the axle to extend alongside the main paddle, the side paddle having a longitudinal proximal edge portion extending adjacent to and lengthwise along the longitudinal axis of the axle, the side paddle radiating outwardly from the longitudinal proximal edge portion to define a distal edge portion toward the interior surface of the tank, said distal edge portion does not radiate outward from the longitudinal proximal edge portion as far as the longitudinal distal edge portion of the main radiates from the longitudinal proximal edge portion of the main paddle;
   said side panel extends along the length of the elongate tank in an orientation so as not to impede the movement of poultry carcasses along the elongate tank;
   wherein the at least one side paddle is disposed at an acute angle relative to the main paddle relative to the axis of the axle; and
   wherein the main paddle and the at least one side paddle are rotatable about an axis extending along the length of the axle.

2. The rocker-type poultry chiller of claim 1, wherein the main paddle is connected to a paddle blade at the distal edge portion of the main paddle.

3. The rocker-type poultry chiller of claim 1, wherein the at least one side paddle is connected to a paddle blade at the distal edge portion of the side paddle.

4. The rocker-type poultry chiller of claim 1, wherein said main paddle is connected directly to said axle.

5. The rocker-type poultry chiller of claim 1:
   further comprising a cross-bar connected to the axle; and
   wherein the cross-bar is connected to the at least one side paddle.

6. The rocker-type poultry chiller of claim 5, wherein said cross-bar is connected to the main paddle.

7. The rocker-type poultry chiller of claim 1, further comprising an electric motor operably connected to said axle.

8. The rocker-type poultry chiller of claim 1, wherein said main paddle oscillates along a portion of an inner surface of said tank.

9. The rocker-type poultry chiller of claim 1, wherein said at least one side paddle oscillates along a portion of an inner surface of said tank.

10. The rocker-type poultry chiller of claim 1, wherein said main paddle pivots when said axle rotates.

11. The rocker-type poultry chiller of claim 1, wherein said at least one side paddle pivots when said axle rotates.

12. The rocker-type poultry chiller of claim 1, further comprising an unloader.

13. A rocker-type poultry chiller, comprising:
   an elongate main paddle having a proximal edge portion extending longitudinally along the length of an elongate poultry chiller tank having an inlet end and an outlet end, the poultry tank receiving poultry carcasses to be cooled in the poultry tank; and
   at least one elongate side paddle extending alongside the elongate main paddle at an acute angle relative to the main paddle, the at least one elongate side paddle having a longitudinal proximal edge portion also extending lengthwise along the length of the elongate poultry chiller tank in parallel relationship with the main elongate paddle, the at least one elongate side paddle defining a plane extending lengthwise along the length of the elongate poultry chiller tank to not impede the movement of the poultry carcasses from the inlet end to the outlet end of the chiller tank;
   wherein the main paddle and the at least one side paddle are rotatable about at least one longitudinal axis extending along the length of the tank as well as longitudinally along the length of the main paddle and along the length of the at least one side panel; and
   at least one of the main paddle and the at least one side paddle is powered to rotate about the longitudinal axis of the tank.

14. The rocker-type poultry chiller of claim 13, wherein only one of the main paddle and the at least one side paddle is powered to rotate about the longitudinal axis and imparts rotary force on the other of the main paddle and side paddle, causing the other of the main paddle and side paddle to rotate about the longitudinal axis.

15. A rocker-type poultry chiller, comprising:
   an elongate tank for receiving poultry carcasses and holding chilled water;
   an axle pivotally mounted in the tank and extending lengthwise through within the tank;
   a pair of elongate main side paddles, each having a proximal edge portion extending adjacent to and along the length of the axle and radiating outwardly from the axle to define a distal edge portion toward the interior surface of the tank, said distal edge portion extending longitudinal to the length of the elongate tank;
   at least one elongate auxiliary paddle extending longitudinally of and between the elongate main paddles having a longitudinal proximal edge portion extending adjacent to and lengthwise along the longitudinal axis of the axle, the auxiliary paddle radiating outwardly from the axle to define a distal edge portion extending toward the interior surface of the tank and extending longitudinal to the length of the elongate tank;
   wherein the proximal edge portions of the paddles and the at least one auxiliary panel extend adjacent to each other along the length and are connected to the axle;
   wherein the main paddles and the auxiliary paddle are disposed at an acute angle relative to each other relative to the longitudinal axis of the axle; and
   wherein the elongate main paddles and the auxiliary paddle are rotatable about an axis extending along the longitudinal proximal edge portion of at least one of the main paddle and the side paddle;

wherein the distal edge portion of the auxiliary paddle not extending toward the interior surface of the tank as far as the distal edge portion of the main side paddles radially extend toward the interior surface of the tank; and wherein the auxiliary paddle defining a plane extending along the length of the elongate tank so as not to impede the movement of the poultry carcasses along the length of the tank.

16. The rocker-type poultry chiller of claim 15, wherein only one of the main paddles and the auxiliary paddle is powered to rotate with the axle, wherein the powered main paddles or the auxiliary paddle imparts rotary force on the other of the main paddles and auxiliary paddle, causing the other of the main paddle and side paddle to rotate about its proximal edge portion.

17. A rocker-type poultry chiller, comprising:
an elongate tank for receiving poultry carcasses and holding chilled water;
an axle mounted in the tank and extending lengthwise along the interior of the tank, the axle powered to oscillate about an axis extending along the length of the axle;
an elongate main paddle connected to the axle, the main paddle having a longitudinal proximal edge portion adjacent to and extending along the length of the axle, the main paddle radiating outwardly from the longitudinal proximal edge portion to define a longitudinal distal edge portion adjacent the interior surface of the tank, the distal edge portion extending lengthwise along the interior of the tank and longitudinal to the length of the tank;
at least one elongate side paddle connected to the axle to extend alongside the main paddle, the side paddle having a longitudinal proximal edge portion extending adjacent to and lengthwise along the longitudinal axis of the axle, the side paddle radiating outwardly from the longitudinal proximal edge portion to define a distal edge portion toward the interior surface of the tank, said distal edge portion extending along the length of the elongate tank;
wherein the at least one side paddle is disposed at an acute angle relative to the main paddle relative to the axis of the axle;
wherein the main paddle and the at least one side paddle are rotatable about an axis extending along the length of the axle; and
wherein the at least one side paddle extends the entire length of the main paddle.

18. A rocker-type poultry chiller, comprising:
an elongate tank for receiving poultry carcasses and holding chilled water;
an axle mounted in the tank and extending lengthwise along the interior of the tank, the axle powered to oscillate about an axis extending along the length of the axle;
an elongate main paddle connected to the axle, the main paddle having a longitudinal proximal edge portion adjacent to and extending along the length of the axle, the main paddle radiating outwardly from the longitudinal proximal edge portion to define a longitudinal distal edge portion adjacent the interior surface of the tank, the distal edge portion extending lengthwise along the interior of the tank and longitudinal to the length of the tank;
at least one elongate side paddle connected to the axle to extend alongside the main paddle, the side paddle having a longitudinal proximal edge portion extending adjacent to and lengthwise along the longitudinal axis of the axle, the side paddle radiating outwardly from the longitudinal proximal edge portion to define a distal edge portion toward the interior surface of the tank, said distal edge portion extending along the length of the elongate tank;
wherein the at least one side paddle is disposed at an acute angle relative to the main paddle relative to the axis of the axle;
wherein the main paddle and the at least one side paddle are rotatable about an axis extending along the length of the axle; and
a side paddle extending along each side of the main paddle.

19. The rocker-type poultry chiller of claim 18, wherein each side paddle is disposed at an acute angle relative to the main paddle relative to the axis of the axle.

* * * * *